Dec. 21, 1943.     L. W. BLAU     2,337,442
WELL LOGGING
Filed Aug. 19, 1940

Ludwig W. Blau   INVENTOR.
BY  P. J. Whelan
ATTORNEY.

Patented Dec. 21, 1943

2,337,442

UNITED STATES PATENT OFFICE 2,337,442

WELL LOGGING

Ludwig W. Blau, Houston, Tex., assignor to Standard Oil Development Company, a corporation of Delaware Application August 19, 1940, Serial No. 353,173

1 Claim. (Cl. 175—182)

The present invention is directed to electrical transient well logging.

It is an object of the present invention to determine the electrical characteristics of formations adjacent a bore hole by the use of electrical transients.

It is a further object of the present invention to impose a high frequency alternating potential across electrodes and measure the variations in potential existing across other electrodes.

Figure 1:
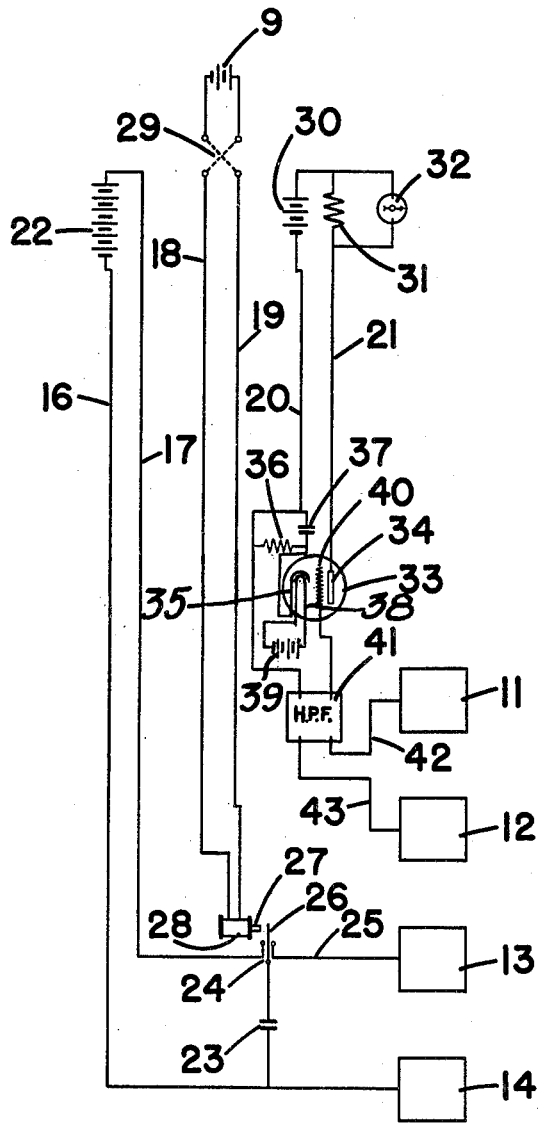
Figure 2:
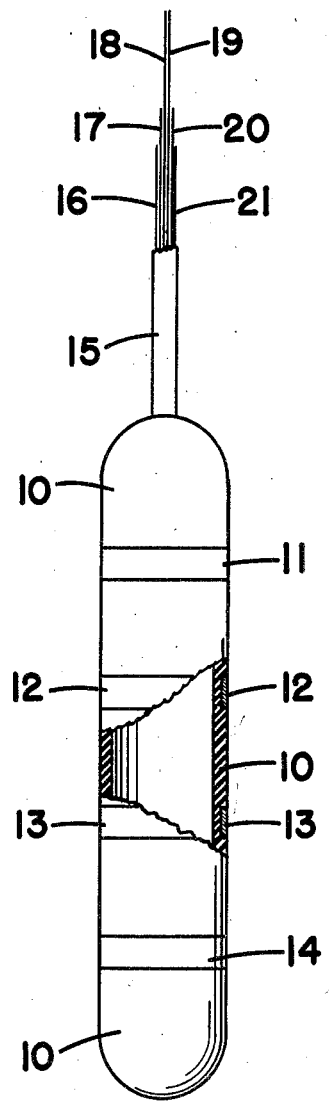

Other objects and advantages of the present invention may be seen from a reading of the following description taken with the accompanying drawing in which Fig. 1 is a diagrammatic illustration of one form of apparatus suitable for carrying out the present invention; and Fig. 2 is a view, partly in cross-section, of an electrode carrying case provided with electrodes and attached to the end of a cable which is suitable for housing the movable portion of the apparatus illustrated in Fig. 1.

Referring specifically to the drawing, electrode carrying case 10 is provided with electrodes 11, 12, 13 and 14 suitably spaced along the electrode carrying case and insulated from each other by suitable insulating material used in the construction of the carrying case. The upper end of the carrying case is attached to cable 15 which contains the insulated electrical conductors 16, 17, 18, 19, 20 and 21.

The upper ends of electrical conductors 16 and 17 are attached to a suitable source of power, such as battery 22 arranged at the surface of the earth. The lower end of conductor 16 is electrically attached to electrode 14. A large condenser 23 has one plate connected to conductor 16 at a point adjacent electrode 14. The other plate of condenser 23 is electrically connected to a switch 24. The size of condenser 23 may vary over a considerable range, although the preferred size may be from 20 to 150 microfarads. Switch 24 has one pole connected to the lower end of electrical conductor 17 of the cable, and another pole electrically connected to electrode 13 by means of conductor 25. An electrical contact 26 of the switch is arranged in cooperative relation with core 27 arranged within a coil or solenoid 28. Coil 28 is connected with electrical conductors 18 and 19 arranged within the electrical cable, the upper ends of these conductors being connected to battery 9 through reversing switch 29.

When the device is used in logging bore holes, the electrode carrier 10 is submerged in drilling mud or fluid contained by the bore hole to be logged. When conductor 26 of switch 24 makes contact with conductor 17, the condenser will be charged by battery 22 arranged at the surface of the earth, but when the position of conductor 26 is changed so that it makes contact through conductor 25, the condenser 23 will be discharged through electrodes 13 and 14.

In order to obtain an indication of high frequency current potentials due to the transients caused by the discharging of condenser 23 through electrodes 13 and 14, electrodes 11 and 12 are connected through a high-pass filter to a vacuum tube voltmeter.

As appears in the drawing, the upper end of conductor 20 is attached to the negative terminal of battery 30, while the upper end of conductor 21 is connected through resistance 31 to the positive terminal of battery 30. Galvanometer 32 is connected across resistance 31 to measure the potential drop therein. A vacuum tube 33 has its plate 34 electrically connected to conductor 21 and its cathode 35 electrically connected to resistance 36 and condenser 37 arranged in parallel, which, in turn, are connected to conductor 20. Cathode 35 is heated by unit 38, electrically connected to battery 39. The grid 40 of the vacuum tube is electrically connected to one terminal of the output side of high-pass filter 41 the other output terminal of which is connected to electrical conductor 20. The other side of the high-pass filter 41 is electrically connected by electrical conductors 42 and 43 to electrodes 11 and 12 which are arranged on the electrode carrier, as above described.

In using the above described apparatus to log wells, the electrode carrying case is moved longitudinally in a bore hole containing liquid, while switch 29 at the surface of the earth is manipulated to cause rapid movement of switch 24 which, in turn, rapidly charges and discharges condenser 23. The condenser 23 is discharged across electrodes 13 and 14 and this, in turn, causes a potential across electrodes 11 and 12. This potential passes to the high-pass filter 41 and hence to the vacuum tube voltmeter. The potential indicated by the vacuum tube voltmeter will be a function of the electrical constants of the fluid in the bore hole and of the adjacent formations. For example, variations in the di-electric constants of the fluid in the adjacent formations will cause a variation in the absorption of the high frequencies present in the electrical transient.

It will be obvious that condenser 23, switch 24, vacuum tube 33, and high-pass filter 41 will be arranged within carrying case 10 on which are carried the externally exposed electrodes 11, 12, 13 and 14. The conductors within cable 15 electrically connect this equipment, which moves in the bore hole, with batteries 22, 9, and 30, switch 29, resistance 31, and galvanometer 32 which are arranged at the surface of the earth. Galvanometer 32 will preferably be a recording galvanometer conventional to the art.

Although a switch 29 electrically connected to coil 28 has been indicated as the means for operating switch 24 to charge and discharge condenser 23, it will be apparent to a skilled worker that many other means are available for operating a switch whereby condenser 23 may be charged and discharged. For example, a clock work arrangement or an electric motor may be arranged within electrode carrying case 10 to cause the periodic operation of switch 24 to charge and discharge condenser 23.

The frequency of transients used in carrying out well logging operations may be varied over a wide range depending upon the amount of accuracy required and the velocity with which the electrode carrier moves through the bore hole. Generally speaking, one cycle for every foot of travel of the electrode carrier in the bore hole may be considered a minimum for indicating the desired information and from this minimum the number may be increased up to any desired amount. It has been found preferable to move the electrode carrier along the bore hole at a speed of not more than 200 feet per minute with the number of transients conveniently being varied from 10 to 50 per second. With such a transient frequency, a potential of 100 volts for charging the condenser has been found to produce satisfactory results.

Although specific modifications of the present invention have been disclosed, it is not my intention to be bound by these specific modifications, but to claim my invention as broadly as the prior art permits.

I claim:

A device for logging a well comprising, in combination, a container, two pairs of electrodes arranged on the exterior of said container, a large condenser arranged in said container, a cable for suspending said container containing at least four insulated electrical conductors, a source of direct current connected to the upper ends of a pair of said conductor cables, the lower end of one said pair being connected to one of said electrodes, and to one side of said condenser, a switch arranged in said container to selectively connect the other side of said condenser to the lower end of the other of said pair of conductors or to an electrode, the other pair of cable conductors being in a circuit including the other two electrodes and a vacuum tube voltmeter.

LUDWIG W. BLAU.